No. 760,692. PATENTED MAY 24, 1904.
W. HUMANS.
INSECT GUARD.
APPLICATION FILED APR. 25, 1903.
NO MODEL.

Witnesses:
Fred S. Greenleaf
Thomas J. Drummond

Inventor.
William Humans,
By Mosby Gregory
Attys.

No. 760,692. Patented May 24, 1904.

UNITED STATES PATENT OFFICE.

WILLIAM HUMANS, OF CAMBRIDGE, MASSACHUSETTS.

INSECT-GUARD.

SPECIFICATION forming part of Letters Patent No. 760,692, dated May 24, 1904.

Application filed April 25, 1903. Serial No. 154,209. (No model.)

*To all whom it may concern:*

Be it known that I, WILLIAM HUMANS, a subject of the King of Great Britain, and a resident of Cambridge, county of Middlesex, State of Massachusetts, have invented an Improvement in Insect-Guards, of which the following description, in connection with the accompanying drawings, is a specification, like characters on the drawings representing like parts.

This invention has for its object to provide a novel and effective guard to be applied to the bodies of trees to prevent insects from creeping or crawling up or down the body of the tree to attack the same.

In accordance with my invention I employ a band, preferably of metal, and at the interior of the band I provide a trap composed of fibrous material so arranged or folded at or near the upper and lower edges of the band as to form one or more pocket-like receptacles between the inturned ends of the fibrous material at each end of the band into which insects or worms destructive to trees enter and from which they do not come out. The band employed is represented as having projections that contact with or tightly rest against parts of the body of the tree to thereby space the band and the fibrous material containing the pockets at the proper distance from the bark of the tree and prevent improper packing or compression of the fibrous material. The band also, as herein shown, is provided with prongs that are employed to confine the fibrous material in working position. The band is so shaped in cross-section that a space is left at its outer side into which may be drawn tarred paper, part of the paper being turned outwardly to present corners or angles over which an insect or worm cannot crawl so as to get upon the body of the tree beyond that portion thereof encircled by the band.

Figure 1:
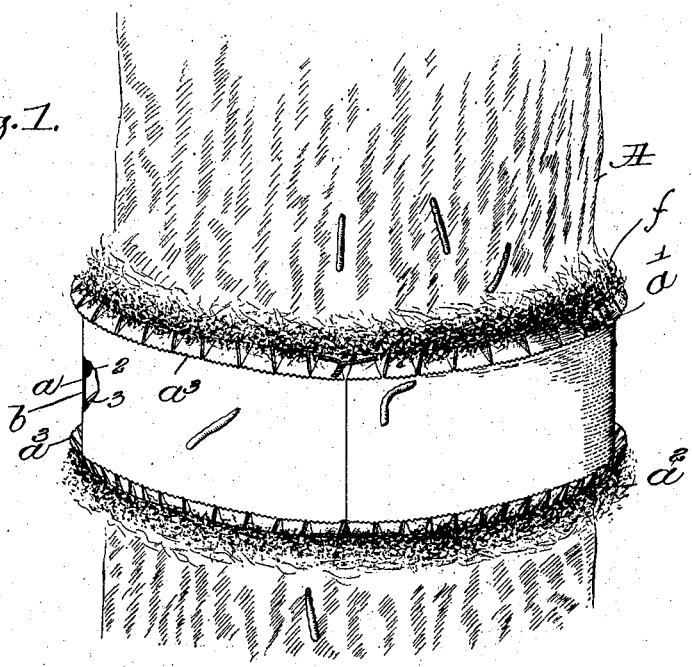
Figure 2:
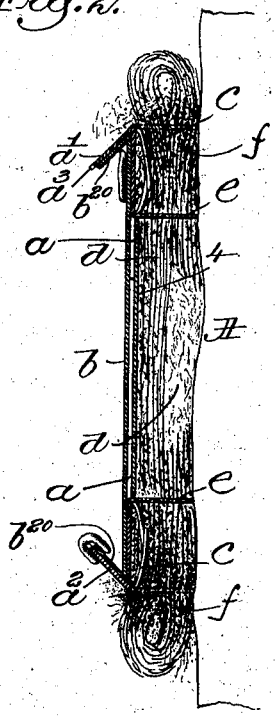
Figure 3:
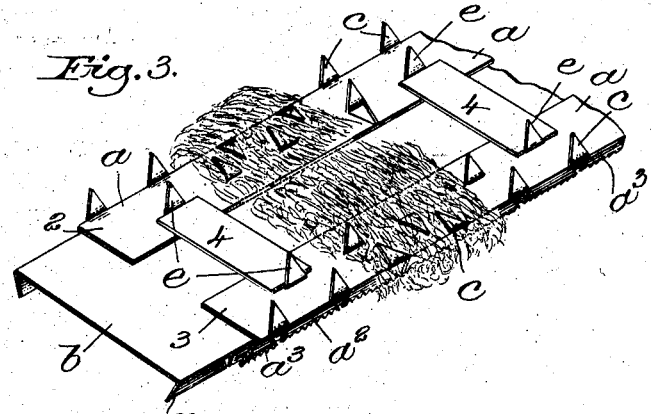
Figure 4:
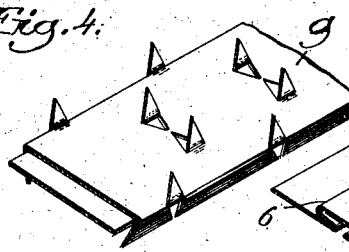
Figure 5:
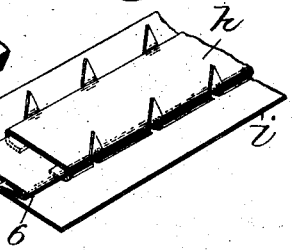
Figure 6:
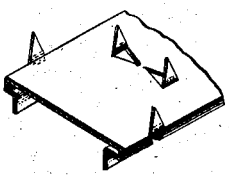

Figure 1 in elevation represents a portion of a tree encircled by an insect-guard embodying my invention. Fig. 2 is an enlarged cross-section thereof. Fig. 3 is a rear side view of the part of the guard or protector shown in Fig. 1. Figs. 4 and 5 show modified forms of bands with tarred paper applied thereto, and Fig. 6 shows yet another modification of band.

My improved insect-guard or tree-protector as applied to a tree A comprises, essentially, a band $a$, preferably of tin or other flexible metal. I slot the band at its upper and lower edges and bend such portions outwardly so as to present two slotted or toothed flanges $a'$ $a^2$, and between said flanges a space is provided in which I may draw a strip of tarred paper or cloth $b$. The tarred paper or cloth is applied to the exterior of the band before the band is applied to the tree-body A, and the outer portion of said band is preferably heavily tarred, so as to cause an insect or, as herein shown, a worm, Figs. 1 and 2, to stick to the tar, and in case a worm or insect should crawl upwardly over the band it would meet the upper flange $a'$ of the strip, and that will prevent the worm from going any farther.

To afford an additional protection against a possibility of a worm getting over the edge of the uppermost flange of the strip, I have shown the edges of the tooth-like portions pointed, as at $a^3$. It is obvious that these points may be more or less sharp, as may be desired.

The band may be composed of one strip or of a plurality of connected strips or pieces of metal. By making the flanges slotted the necessary flexibility is provided at the upper and lower edges of the band, so that it can be made to conform readily to the diameter of the tree and to irregularities in its circumference.

I provide the inner face of the band with suitable pointed prongs $c$. These prongs enter or receive upon them a sheet of hemp, tow, excelsior, cotton, or any other suitable fibrous material $f$, and I have found hemp to be exceedingly effective. The prongs are bent downwardly after being inserted through the fibrous material to thereby hold it firmly on the band, leaving the ends of the fibers projecting from the upper and lower edges of the band for about one-half the width of the band. These projecting ends are then turned backwardly to overlie the portions of the fibrous material confined to the band by prongs, the turned-back ends at the upper and lower portions of the band leaving between them suitable pockets or receptacles, as $d$.

(Represented as enlarged in Fig. 2 to more clearly illustrate my invention.) I also provide the inner side of the strip with suitable rests $e$, said rests extending inwardly from the band and being adapted to contact lightly with the bark of the tree, to thereby insure a space between the band $a$ and the bark of the tree, so that the fibrous material is not compacted and embedded closely between the band and the body of the tree.

A worm crawling up or down the body of the tree will crawl between the fibrous material and the tree-body and get behind the band; but the worm before it reaches the opposite end of the band will enter the pocket $d$ and feeling that it has reached a suitable place to remain will embed itself in the thicker portion of the fibrous material adjacent the edge of the trap or protector.

I have found by experience that worms and insects destructive to tree life embed themselves in large numbers in the pocket afforded by inturning upon itself a portion of the fibrous material connected with the band.

The prongs $c$ shown are represented as formed from the band by punching out or backwardly a portion of the band, and at the edges of the latter they can be conveniently made from the parts of the band which are cut out between the tooth-like portions of the flanges.

To confine the band to the tree, I apply a wire, as shown in Fig. 1, in the spaces formed by turning backwardly the line of prongs $c$, and owing to the shape of the notches left after turning back the prongs $c$ it will be seen that the wire once twisted into position cannot be readily detached, and consequently the protector is securely confined to the tree-body.

Fig. 3 shows the band $a$ as composed of two pieces of metal 2 3, united by narrow strips 4, said narrow strips being attached by solder or in any other suitable way. There may be any desired number of prongs $c$ and they may be formed at any point in the width of the band, as well as at the flange portions thereof.

In Fig. 4 I have shown on a smaller scale a band made of a single piece of metal with its opposite edges flanged outwardly, the edges of the flanges being turned one toward the other.

Fig. 5 shows a band composed of a single piece of metal $h$, much narrower than the band shown in Figs. 3 and 4, and the edges of this band are turned outwardly and are brought closer together than in Figs. 3 and 4.

The tarred paper $i$, drawn into the space at the outer side of the strip $h$, Fig. 5, is folded centrally to present two like edges 6, that enter the hooks formed by bending the strip $h$ outwardly.

Fig. 6 shows a strip composed of a single sheet of metal, the outer edges of which are bent somewhat differently from that shown in Figs. 1 to 3.

As most clearly shown in Fig. 2, the upper and lower edges of the tarred paper $b$ are bent outward beneath the flange portions of the band, as at $b^{20}$, and such turned or bent portions of the paper serve to close or cover the slots or openings in the flanges, so that the insects cannot crawl therethrough.

This invention is not limited to the exact shape shown for the outwardly-bent edges of the band, as the same may be varied within limits without departing from my invention, the essential feature of the edges being that they act as a barrier to the worm crawling over the tarred paper or cloth applied to the exterior of the band.

Having fully described my invention, what I claim as new, and desire to secure by Letters Patent, is—

1. An insect-guard comprising a metallic band having a plurality of integral inturned rests to contact with the body of the tree to maintain the band throughout its width at a distance outside the tree, and fibrous material secured to the inner side of the band between it and the tree.

2. An insect-guard comprising a metallic band having a series of prongs and rests to contact with the body of the tree to sustain the band at a distance outside the tree, and fibrous material applied to the inner side of the band and folded on itself to provide a pocket between the inturned ends.

3. An insect-guard comprising a metallic band having prongs, and fibrous material entered by said prongs to confine said material to said band.

4. An insect-guard comprising a band of metal, and a layer of fibrous material applied to the inner side of said band, the edges of said layer being extended beyond the edges of said band and inturned on the body of the band.

5. In an insect-guard, a metallic band having outturned edges, and prongs to enter and hold fibrous material.

6. In an insect-guard, a metallic strip having outturned, slotted flanges, and prongs.

7. In an insect-guard, a metallic strip having outturned, slotted flanges, and inturned prongs and projections, the prongs to confine fibrous material to said band, and the projections to contact with a tree-body and keep the body of the band out of contact with the tree.

8. In an insect-guard, a metallic band, having portions thereof outturned to form a space between them, and a tarred strip drawn into said space and embracing said band.

9. An insect-guard comprising a metallic band having outturned flanges to form a space, a tarred strip drawn into said space at the exterior of said band, and fibrous material connected with said band and infolded to form a pocket therein for the entrance of insects.

10. An insect-guard comprising a flexible band to encircle a tree and having outturned flanges at its upper and lower edges, a strip of tarred material on the exterior of the band, held in position by and between the flanges, and fibrous material connected with the interior of the band and infolded to form a pocket, or pockets, for the entrance of insects.

In testimony whereof I have signed my name to this specification in the presence of two subscribing witnesses.

WILLIAM HUMANS.

Witnesses:
　GEO. W. GREGORY,
　EDITH M. STODDARD.